United States Patent
Apte et al.

(10) Patent No.: US 10,162,612 B2
(45) Date of Patent: *Dec. 25, 2018

(54) METHOD AND APPARATUS FOR INVENTORY ANALYSIS

(71) Applicant: SYNTEL, INC., Troy, MI (US)

(72) Inventors: Abhijit Apte, Maharashtra (IN); Abhishek Negi, Maharashtra (IN); Vivek Rao, Maharashtra (IN); Amit Pundeer, Maharashtra (IN); Sagar Kulkarni, Maharashtra (IN); Prashant Ladha, Maharashtra (IN); Shashank Moghe, Maharashtra (IN); Vedavyas Rallabandi, Chennai (IN); Ravi Shankar, Maharashtra (IN); Lopamudra Dhal, Maharashtra (IN); Prabhat Parey, Maharashtra (IN); Abhishek Agarwal, Maharashtra (IN); Rahul Mehra, Maharashtra (IN)

(73) Assignee: Syntel, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,492

(22) Filed: Jan. 3, 2017

(65) Prior Publication Data

US 2017/0193437 A1    Jul. 6, 2017

Related U.S. Application Data

(60) Provisional application No. 62/441,785, filed on Jan. 3, 2017, provisional application No. 62/274,488, filed on Jan. 4, 2016.

(51) Int. Cl.
*G06F 9/45* (2006.01)
*G06F 8/41* (2018.01)
(Continued)

(52) U.S. Cl.
CPC ............. *G06F 8/427* (2013.01); *G06F 8/51* (2013.01); *G06F 8/76* (2013.01); *G06F 17/303* (2013.01);
(Continued)

(58) Field of Classification Search
USPC ........................................................ 717/137
See application file for complete search history.

(56) References Cited

U.S. PATENT DOCUMENTS 6,170,078 B1 * 1/2001 Erle ............... G01R 31/318342
714/25
7,707,007 B2    4/2010 Campbell
(Continued)

FOREIGN PATENT DOCUMENTS

WO      2004077215 A2    9/2004

OTHER PUBLICATIONS

RES—A Pure Java Open Source COBOL to Java Translator (Aug. 1, 2010, 9 pgs.).
(Continued)

*Primary Examiner* — Chameli Das
(74) *Attorney, Agent, or Firm* — Dykema Gossett PLLC

(57) ABSTRACT

A method and apparatus for migration of application source code may include parsing the source code and generating a first output, dynamically analyzing the source code to produce a second output wherein the second output comprises runtime metadata associated with the application, converting, using the runtime metadata, the source code of the application in an original language to a destination language on the second platform and a data source in an assigned format to a destination format. The method may include simulating memory to execute the source code by simulating a dynamic memory array, executing the source code within the dynamic memory array, detecting and resolving param-
(Continued)

eters of the source code by monitoring execution of the source code, and storing the detected and resolved parameters of the source code in a metadata register.

17 Claims, 12 Drawing Sheets

(51) Int. Cl.
*G06F 17/30* (2006.01)
*G06F 8/76* (2018.01)
*G06F 8/51* (2018.01)
*G06Q 10/10* (2012.01)
*G06Q 10/08* (2012.01)

(52) U.S. Cl.
CPC .. *G06F 17/30684* (2013.01); *G06F 17/30705* (2013.01); *G06Q 10/087* (2013.01); *G06Q 10/10* (2013.01)

(56) References Cited

U.S. PATENT DOCUMENTS

| | | | |
|---|---|---|---|
| 7,996,413 | B2 | 8/2011 | Cotichini et al. |
| 9,389,890 | B2 | 7/2016 | Hamby et al. |
| 9,390,260 | B2 | 7/2016 | Tan et al. |
| 2002/0178233 | A1* | 11/2002 | Mastrianni ............... G06F 8/60 709/217 |
| 2003/0188299 | A1 | 10/2003 | Broughton et al. |
| 2005/0097521 | A1 | 5/2005 | Liu |
| 2005/0102572 | A1* | 5/2005 | Oberlaender ....... G06F 17/5022 714/29 |
| 2005/0262191 | A1* | 11/2005 | Mamou ............ G06F 17/30563 709/203 |
| 2006/0067436 | A1* | 3/2006 | Potkonjak .......... H03M 13/395 375/341 |
| 2006/0277531 | A1 | 12/2006 | Horwitz et al. |
| 2007/0050343 | A1* | 3/2007 | Siddaramappa .. G06F 17/30908 |
| 2007/0067756 | A1 | 3/2007 | Garza |
| 2008/0005619 | A1* | 1/2008 | Arons ................. G06F 11/3604 714/38.1 |
| 2008/0306986 | A1 | 12/2008 | Doyle, Sr. |
| 2009/0064091 | A1 | 3/2009 | Tonkin et al. |
| 2009/0164491 | A1* | 6/2009 | Cotichini ............. G06F 17/303 |
| 2010/0107119 | A1* | 4/2010 | Libert ............... G06F 17/30126 715/810 |
| 2011/0270597 | A1* | 11/2011 | Baumgartner ...... G06F 17/5022 703/14 |
| 2013/0339185 | A1* | 12/2013 | Johnson .................. H04W 4/02 705/26.8 |
| 2014/0372992 | A1 | 12/2014 | Yoon et al. |
| 2015/0040097 | A1 | 2/2015 | Martin et al. |
| 2015/0089063 | A1 | 3/2015 | Soni et al. |
| 2015/0331681 | A1* | 11/2015 | Rose ....................... G06F 8/437 717/143 |
| 2016/0070724 | A1* | 3/2016 | Marrelli ............ G06F 17/30303 707/692 |
| 2017/0116007 | A1* | 4/2017 | Cimadamore .......... G06F 8/315 |

OTHER PUBLICATIONS

IBM Resource Access Control Facility (RACF), Resource Access Control Facility (Jun. 2016, 1 pg.).
Application Analyzer: Technology Suite: TCS Master Craft: Offerings: Home (2 pgs.), retrieved from https://archive.org/web/ (Wayback Machine) with date of Jan. 22, 2014.
Rule Extraction Workbench: Transform Suite: TCS Master Craft: Offerings: TCS (2 pgs.), retrieved on-line on Oct. 15, 2015.
Application Transformer: Transform Suite: TCS Master Craft: Offerings: Home (1 pgs.), retrieved from https://archive.org/web/ (Wayback Machine) with date of Jan. 22, 2014.
Application Analysis and Visualization—Micro Focus Enterprise Analyzer (2 pgs.), retrieved from https://archive.org/web/ (Wayback Machine) with date of Jan. 16, 2014.
Metalogic Systems, "Insight AMS" (2 pgs.), retrieved from https://archive.org/web/ (Wayback Machine) with date of Mar. 16, 2014.
Eranca "Solution" (5 pgs.), dated Mar. 10, 2015.
Accenture "Accenture Cloud Application Migration Services", A smarter way to get to the cloud (8 pgs.), dated 2014.
IBM Tivoli Workload Scheduler, User's Guide and Reference, Version 9, Release 2 (836 pgs.), dated 2014.
CA Workload Automation CA 7 Edition, CA Technologies (8 pgs.), retrieved from https://archive.org/web/ (Wayback Machine) with date of Feb. 27, 2016.
What's New in BMC Control-M 8, Product Data Sheet, (2 pgs.), dated Oct. 2012.
CA Unified Infrastructure Management—CA Technologies (6 pgs.), retrieved from https://archive.org/web/ (Wayback Machine with date of Apr. 21, 2014).
IBM Resource Access Control Facility (RACT), Resource Access Control Facility (1 pg), dated Nov. 2008.
CA Top Secret—CA Technologies, Ensure Scalable and Streamlined Mainframe Security (7 pgs.), dated Jul. 29, 2015.
CA ACF2 for z/Os, Quick Reference Guide (r 12) (3rd Edition, 101 pgs.), dated 2009.
Active Directory, Chapter 11 from Introducing Windows 2000 Server, Microsoft Press (14 pgs.), dated Dec. 9, 2009.
CA View—CA Technologies (6 pgs.), retrieved from https://archive.org/web/ (Wayback Machine) with date of Feb. 20, 2016.
CA Deliver—CA Technologies (6 pgs.), retrieved from https://archive.org/web/ (Wayback Machine) with date of Feb. 27, 2016.
IBM FileNet P8 Platform V 5.2.1 publication library (4 pg.), retrieved from https://archive.org/web/ (Wayback Machine) with date of Feb. 17, 2015.
Virtual Machinery—Sidebar 2—The Halstead Metrics (4 pgs.), retrieved from https://archive.org/web/ (Wayback Machine) with date of Sep. 23, 2014.
McCabe Cyclomatic Complexity (2 pgs.), retrieved from https://archive.org/web/ (Wayback Machine) with date of May 15, 2014.

* cited by examiner

METHOD AND APPARATUS FOR INVENTORY ANALYSIS

CROSS REFERENCE TO RELATED APPLICATION

This application claims the benefit of, and priority to, U.S. Patent Application No. 62/441,785, filed Jan. 3, 2017 (the '785 application) and U.S. Patent Application No. 62/274,488, filed Jan. 4, 2016 (the '488 application). The '785 application and the '488 application are hereby incorporated by reference as though fully set forth herein.

TECHNICAL FIELD

The present disclosure relates generally to a method and apparatus for an analysis of an inventory of computer source code, and more particularly to a method and apparatus for inventory analysis for the migration of such source code.

BACKGROUND

This background description is set forth below for the purpose of providing context only. Therefore, any aspects of this background description, to the extent that it does not otherwise qualify as prior art, is neither expressly nor impliedly admitted as prior art against the instant disclosure.

There is a desire for current or modern computer systems running applications to be agile, proactive, flexible and prescriptive in real-time. Modernizing legacy applications may resolve these problems and may help users migrate applications to modern applications that may offer cloud adoption, digital and analytical capabilities. Some challenges in analyzing legacy applications may include the amount of time required to migrate legacy systems and the related impact on business operations, including costs and personnel requirements, errors may creep into a manual migration method increasing the risks to business operations, and the ability to find the right resources to perform migration of legacy applications.

There is, therefore, a need for solutions that allow inventory analysis for migration from legacy applications to modern applications. The foregoing discussion is intended only to illustrate aspects of the present field and should not be taken as a disavowal of claim scope.

SUMMARY

In embodiments, a system and method for inventory analysis for migration of application source code from a first platform to a second platform may include a method of selecting at least one application. In embodiments, the method may include parsing the source code and generating a first output. In embodiments, the method may include dynamically analyzing the source code to produce a second output wherein the second output comprises runtime metadata associated with the selected at least one application. In embodiments, the method may include converting, using said first output and said second output comprising runtime metadata, at least one of the source code of the selected application in an original language to a destination language on the second platform and a data source in an assigned format to a destination format. Other methods, systems, and apparatus descriptions and/or embodiments are also presented herein.

Aspects, features, details, utilities, and advantages of embodiments of the present disclosure will be apparent from reading the following description and claims, and from reviewing the accompanying drawings.

DETAILED DESCRIPTION

Figure 1:
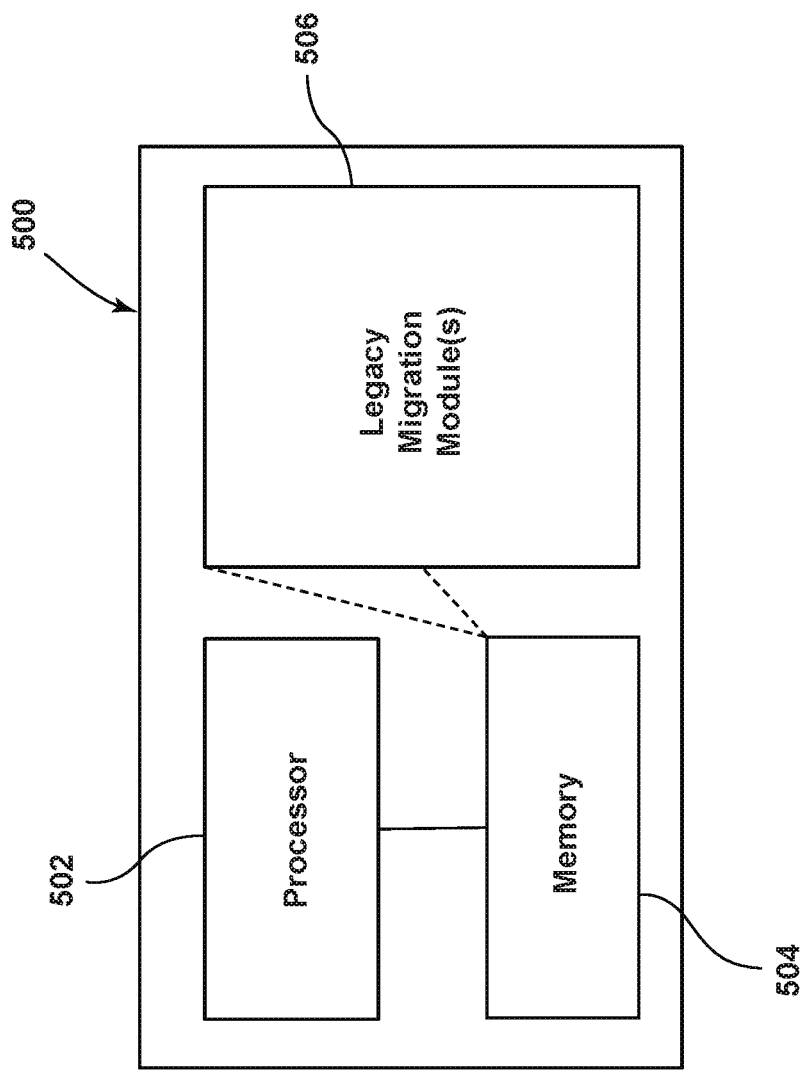
FIG. 1 is a block diagram generally illustrating an embodiment of a legacy migration tool in accordance with teachings of the present disclosure.

Legacy software is deeply embedded in customer organizations with extreme complexity. There are plethora of problems with such legacy applications, like the lack of agility, skills shortage, high costs of ownership, and increasingly complex regulatory compliance standards. In the new digital era, having information technology (IT) systems that are agile, proactive, flexible and prescriptive in real time is the key to business growth.

Legacy modernization provides solutions to all these problems and helps the customer get into a non-legacy distributed platform, for example, with enablement for cloud adoption, as well as digital and analytics capabilities. Customers typically face a number of challenges in such legacy modernization. An early step in such legacy modernization involves an analysis of an application portfolio. However, such an analysis involves a number of challenges, such as, for example only, (i) analyzing the application portfolio to understand the complexity of individual program components; (ii) identifying the components that are not used in the application portfolio (obsolete program objects); (iii) determining the number of database tables accessed by the program objects and the create/read/update/delete (CRUD) operations; (iv) understanding the job sequences and flow of the jobs—successor and predecessors; (v) determining how the business logic is implemented in the program objects (i.e., understanding the program flow); and (vi) finalizing the scope to derive a futuristic roadmap (for the migrated applications).

Embodiments consistent with the instant teachings provide solutions to one or more of the above-identified challenges. Embodiments provide an inventory analysis tool platform to perform an asset analysis of an entire application portfolio in automated way to reduce the human effort significantly. Embodiments of the inventory analysis tool facilitate analysis of the code base and are configured to generate various reports to understand the state of the current asset's complexity, which in turn help in accelerating the migration/modernization process and reduce risks in finalizing the scope for a futuristic roadmap.

Additionally, embodiments of an inventory analysis tool handles a plurality of legacy computer programming languages, such as but not limited to Common Business Oriented Language (COBOL), Programming Language One (PL1), Natural, Assembler, Coolgen, Visual Basic 5 (VB5), Job Control Language (JCL), and the like. In an embodiment, the inventory analysis tool may be implemented as "Software as a Service" (SaaS) model. In such a delivery model, a customer can select and subscribe to different legacy languages based on the technology stack in their current enterprise IT portfolio.

Additionally, embodiments of the inventory analysis tool are configured to assist customers to create different projects based on the business functionalities (e.g., Sales, Purchase, marketing) and upload the code based on the business classification. Embodiments of the inventory analysis tool supports both role-based and subscription-based execution on the technology and lines of code (LOC) to be analyzed. The design of inventory analysis tool may comprise a plug and play framework platform, which helps integrating the new tool feature without disturbing the existing features. There is no limitation in the framework, it allows to integrate different open source tools quickly with little/no effort. The "On Premise installation" of an embodiment of the inventory analysis tool may be configured to help customers to avoid bringing source code base out of their enterprise network due to security reasons.

In general, embodiments of the inventory analysis tool are configured to provide interactive analysis of the legacy inventory of the user (customer) in order to provide volumetric and complexity analysis, job flow details, and code quality reports. Additionally, embodiments of the inventory analysis tool allows business module classification to determine module level complexity. In addition to mainframe technologies like COBOL, Customer Information Control System (CICS), Information Management System (IMS), Database 2 (DB2), Coolgen, Virtual Storage Access Method (VSAM) and the like, embodiments of the inventory analysis tool also support JAVA, C, C++, Visual Basic 6 (VB6), VB.NET, C# ("C sharp") applications.

Before proceeding to a detailed description of various embodiments of an inventory analysis tool, a general overview of a larger legacy migration system will first be set forth in order to provide context in which the inventory analysis tool resides.

FIG. 1 is a simplified block diagram of a computer-implemented system 500, in an embodiment, for migrating legacy applications to a new, modern computing platform. In the illustrated embodiment, system 500 may include one or more processors 502, a memory 504, a variety of input/output mechanisms (not shown) such as a display, a microphone, a speaker, and a network interface (wired or wireless), and a legacy migration module(s) (or tool) 506 configured generally to facilitate migration of legacy computer programs/applications.

Processor 502 is configured generally to control the overall operation of system 500, including coordination and cooperation among and between the other components of system 500. In an embodiment, processor 502 is configured to execute a suitable operating system. Processor 502 may include a central processing unit (CPU), memory (in addition to or such as the illustrated memory 504) and an input/output (I/O) interface through which processor 502 may receive a plurality of input signals and to generate a plurality of output signals.

Memory 504 is provided for storage of data and instructions or code (i.e., software) for processor 502. Memory 504 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although illustrated as a separate component in the illustrated embodiment, it should be understood that memory 504 may be internal to processor 502.

Legacy Migration Generally.

Legacy migration module(s) 506 may include application programs stored in memory 504 and configured for execution by one or more processors 502, to achieve an overall function of legacy computer system migration. Generally, legacy migration module(s) 506 provides an accelerator platform for hosting various migration and modernization tools, and may include a modernization lifecycle based platform that facilitates a user migrating out of a legacy environment in a de-risked and accelerated way.

Legacy migration module(s) 506 may include the following components and/or layers. Generally, legacy migration module(s) 506 include a presentation layer, a service layer, a business layer, an integration layer, a data access layer, and a security layer. The presentation layer includes views that are built with Hypertext Markup Language 5 (HTML5) User Interface (UI) with Cascading Style Sheets 3 (CSS3) & jQuery UI elements via a bootstrap network. The data elements are pushed from the controllers into the view via models. Velocity templating engines are used for generating the menus. The service layer includes an application that exposes various services for maintaining the data sanity between the clients and the servers. The business layer includes the SaaS logic for utilizing various tools built with the experienced project execution and automation of the predictable work. The integration layer allows the tools to run in online/batch mode based on the time estimates for the successful completion. The users are kept updated via the email messages to ensure optimized time utilization for the end users. The data access layer includes hibernated entities that were used for the optimized effort utilization of the developer to allow them to focus on the core customer problems instead of the standard routine application problem. The security layer includes a spring security Application Program Interface (API) that is leveraged for interfacing with Lightweight Directory Access Protocol (LDAP) servers and controlling the usage of the features that the portal has to offer the user.

Figure 2:
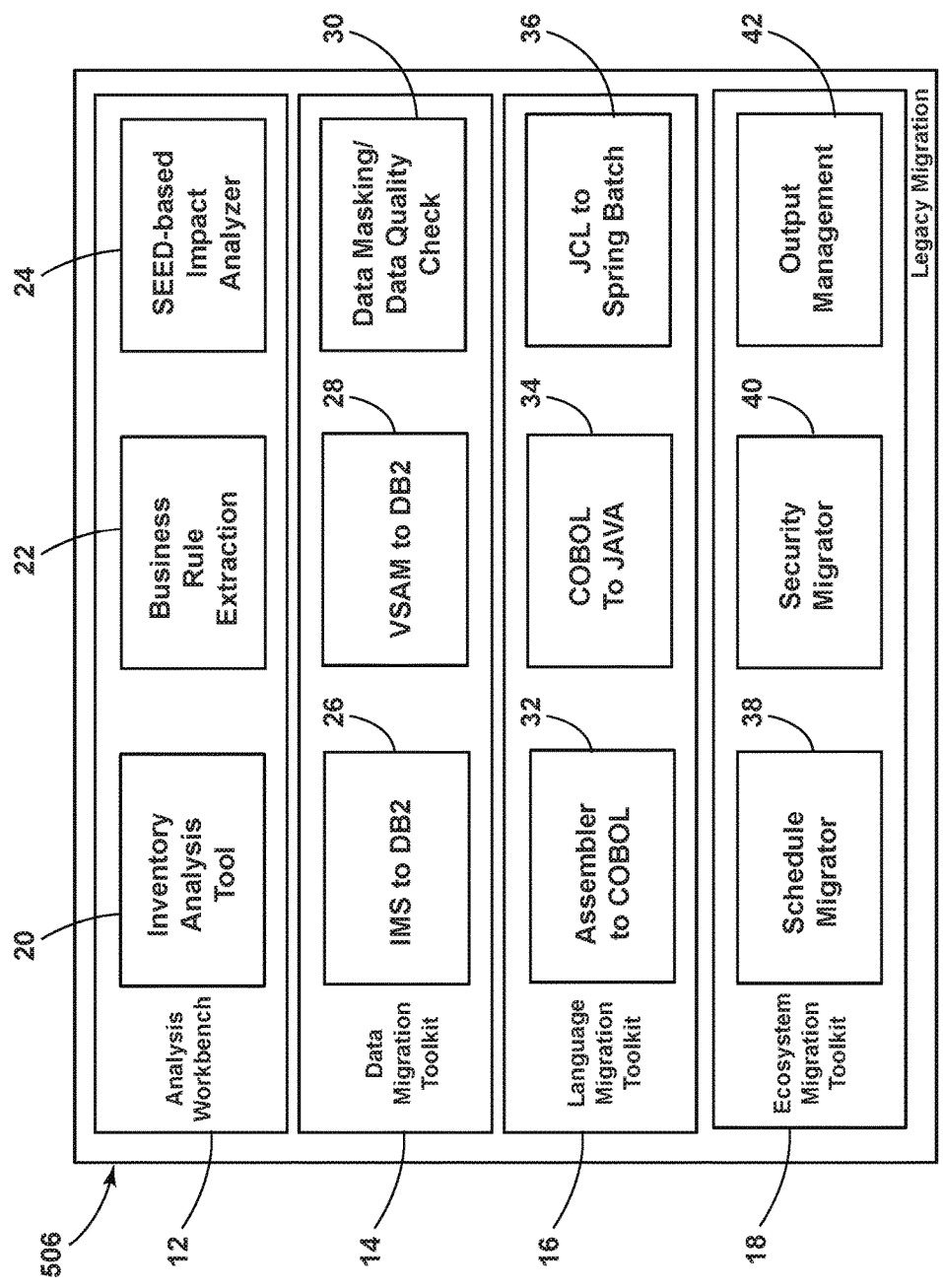
FIG. 2 is a block diagram generally illustrating in greater detail the legacy migration tool of FIG. 1.

In the illustrated embodiment, FIG. 2 is a simplified block diagram showing, in greater detail, the various functional module(s) included in legacy migration module 506. In this regard, legacy migration module(s) 506 may include one or more workbenches and/or toolkits that may contain one or more applications, tools, and/or modules (hereafter, the terms "applications", "tools", and "modules" may be used interchangeably), such as, but not limited to, an analysis workbench 12, a data migration toolkit 14, a language migration toolkit 16, and/or an ecosystem migration toolkit 18. It should be understood that each of the referred-to applications, tools, toolkits, workbench(es), and/or modules may comprise software stored in memory 504 and configured for execution by one or more processors 502.

Legacy migration module(s) 506 may be configured as a "Software as a Service" (SaaS), where users (e.g., customers), may subscribe (e.g., enroll), in one or more of the application toolkits 12, 14, and/or 16 described above. Users may configure one or more subscriptions to application to legacy migration module(s) according to predetermined attributes (e.g., cost, size, volume, and duration of usage). Legacy migration module(s) 506 may be configured to be accessed by way of the web (e.g., Internet), using a conventional web browser, or alternatively, can be configured as an "on premises installation" via hard copy installation.

With continued reference to FIG. 2, analysis workbench 12 may include one or more applications such as, but not limited to, an inventory analysis tool 20 (hereinafter "TAT 20"), a business rule extraction tool 22, and/or a seed-based impact analyzer tool 24. TAT 20 provides interactive analysis of the legacy inventory to provide volumetric and complexity analysis, job flow details and code quality reports. TAT 20 allows business module classification to determine module level complexity. In addition to mainframe technologies like COBOL, CICS, IMS, DB2, Coolgen, Natural, Focus, Assembler, ADABAS (Adaptable Database System), PL/1, VSAM, and the like, the TAT 20 also supports JAVA, C, C++, VB6, VB .NET, C#.Net, JCL Procs and Control Cards, Job schedulers (Control M, CA7) applications. The design of TAT 20, in an embodiment, (i) allows multiple languages inventory to be analyzed simultaneously, (ii) helps in sizing the database, files, etc., (iii) provides a natural language processor (NLP) wherein the inclusion of the NLP based query facility allows customers to ask English language questions to get the relevant answers. The TAT 20 will be set forth in greater detail below in connection with FIGS. 3-12. Business rule extraction tool 22 is configured generally as a rule extraction tool platform to extract business rules from the code by way of analysis in an automated and semi-automated way, the details of which are set forth in co-pending U.S. application Ser. No. 15/397,486, filed on Jan. 3, 2017, (entitled "METHOD AND APPARATUS FOR BUSINESS RULE EXTRACTION"), hereby incorporated by reference as though fully set forth herein. The seed-based impact analyzer 24 is configured generally to search the program inventory for the seed entered by the user and displays the result to the user.

The data migration toolkit 14 may include one or more applications such as, but not limited to, a data migration tool(s) 26, 28 and/or a data masking/data quality check tool 30. The data migration toolkit 14 supports VSAM to DB2, IMS to DB2, ADABAS to RDBMS (Relational Database Management System). In an embodiment, the IMS to DB2 module 26 may be configured to provide an end-to-end migration solution to migrate data from hierarchical database IMS DB to DB2, for example. The tool 26 may be configured to convert application code modification, Data Definition Language (DDL) for target schema generation, and data migration scripts, may provide intermediate optimization of target schema and re-create the Structure Query Language (SQL) statements and/or may converts the application code (JCL, Pick Procedure Language "PROC", COBOL) from IMS specific calls to DB2 compliant calls. The VSAM to DB2 database migrator 28 may be configured to provide an end-to-end migration solution to migrate data from files based data source VSAM to DB2. It should be understood that additional language migration tools may be included in data migration toolkit 14, such as, but not limited to, ADABAS to RDBMS. The tool may cover application code modification, DDL for target schema generation, and data migration scripts, provide intermediate optimization of target schema and re-create the SQL statements and/or convert the application code (JCL, PROC, COBOL) from VSAM specific calls to DB2 compliant calls. The database migrator toolkit 14 may be configured to provide one-to-many mapping where the optimizer may also provide abilities to set defaults, allow nulls, change data types and/or optimize the overall design. The database migration tools may also generate data migration programs based on the changes made by a user in schema using an optimizer. The data masking and data quality check tools 30 may provide additional functionality. In order to protect sensitive data during database migration, the data masking tool may allow propagation of masked data as part of database migration process. A data quality checking tool may allow pre-quality checks on the data before the data/database is migrated.

The language migration toolkit 16 may include one or more applications such as, but not limited to, an assembler to COBOL tool 32, a COBOL to JAVA tool 34, and/or a job control language (JCL) to spring batch tool 36, which facilitate conversion of a legacy application configured in a legacy programming language into a modern application configured in a modern programming language. The language migration toolkit 16 supports assembler to COBOL, COBOL to JAVA, COBOL to .Net, PL/1 to JAVA, Natural to COBOL, Natural to JAVA, JCL to Spring Batch and JCL to Summer Batch. It should be understood that additional applications such as, but not limited to, COBOL to JAVA Classes and COPYBOOK as POJO Class, CICS COBOL/DB2 to JAVA/ANGULAR JS/Oracle, COBOL to C# ("C sharp"), CICS COBOL/DB2 to ASP.net/ANGULAR JS/Oracle, PL/1 with DB2, VSAM, and Sequential File handling programs and copybooks into JAVA programs and classes, and RDBMS as a database store, supports converting PL/1 online screens Basic Mapping Support (BMS) to HTML/ANGULAR JS, Natural/ADABAS and Sequential File handling programs into COBOL DB2, Natural online maps to CICS BMS, ADABAS to DB2 in COBOL, Natural to COBOL, and/or Natural to JAVA may be included in the language migration toolkit 16. The assembler to COBOL tool 32 may be configured to convert Assembler macros and copybooks into COBOL programs, for example, an may cover application code automated migration from second Generation Assembler language to third generation COBOL language, convert assembler copybooks to COBOL copybooks, and/or convert conditional assembly instructions to COBOL statements. Assembler to COBOL tool 32 may be configured to use a unique technique where it does not limit to static code analysis. The assembler to COBOL migration tool 32, in an embodiment, may simulate the assembler execution to resolve the registers and operands as necessary. The COBOL to JAVA tool 34 may be configured to convert COBOL programs into JAVA Plain Old JAVA Object (POJO) class. The tool 34 may support conversion from CICS COBOL/DB2 to Java/Oracle and may also supports file operations, and may be configured to ensure that there are no functional gaps due to automated migration process.

Finally, JCL to Spring Batch tool 36 may be configured to convert JCL, COBOL, files to equivalent Eclipse Project containing Spring batch, tasklets, and Java POJO objects, and, may provide pre-built Cloud-enabled java utilities that are equivalents of JCL utilities including SORT and database manipulations. A language migration toolkit embodiment may be seen by reference to co-pending U.S. application Ser. No. 15/397,473, filed on Jan. 3, 2017, (entitled "METHOD AND APPARATUS FOR MIGRATION OF APPLICATION SOURCE CODE"), hereby incorporated by reference as though fully set forth herein.

The ecosystem migration toolkit 18 may include one or more applications, such as, but not limited to, a scheduler migrator tool 38, a security migrator tool 40, and/or an output management tool 42. For example only, scheduler migrator tool 38 may be configured to migrate legacy schedules, such as CA-7, Control-M, CA-Unicenter, and the like, to a modern scheduler, like IBM Tivoli Workload Manager. Security migrator tool 40 may be configured to migrate application and system level security (like Resource Access Control Facility (RACF), TopSecret, and Access Control Facility 2 (ACF2)) to security systems for distributed platforms, like Active Directory. Output management tool 42 may be configured to migrate output, content and report management (like CA-View/Deliver, ASG-Mobius, and IBM FileNet).

Inventory Analysis Tool.

Figure 3:
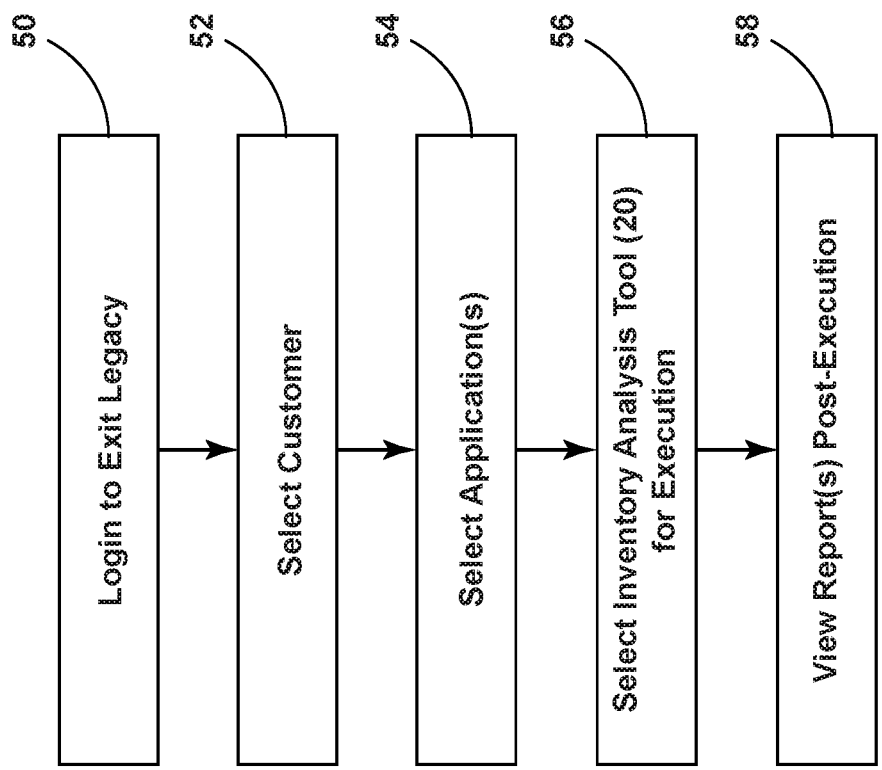
FIG. 3 is a flowchart generally illustrating an embodiment of a method and apparatus for inventory analysis.

FIG. 3 is a high-level flow chart diagram illustrating, in an embodiment, the operation of a method of operation of the IAT 20 included in the larger legacy migration tool 506. The method begins in step 50.

In step 50, a user may access IAT 20 by first logging into the legacy migration tool 506 (e.g., "Exit Legacy") via a user interface (UI) such as a graphical user interface (GUI). The method then proceeds to step 52.

In step 52, the user may select a customer via the GUI (e.g., a drop-down list). The method then proceeds to steps 54 and 56.

In steps 54 and 56, the user may first select via the GUI one or more toolkits/workbenches available for selection from the legacy migration tool 506 (e.g. see FIG. 2, one or more application workbenches and/or toolkits 12, 14, 16, and/or 18 and/or one or more applications 20, 22, 24, 26, 28, 30, 32, 34, 36, 38, 40, and/or 42 may be displayed via the GUI in step 56). For example, to access the IAT 20, the user selects IAT 20 from the GUI in step 56. It should be understood that toolkits 12, 14, 16, and/or 18 and/or applications 20, 22, 24, 26, 28, 30, 32, 34, 36, 38, 40, and/or 42 displayed to the user via the GUI (e.g., drop down list), and/or may be configured to correspond to a subscription service and/or usage agreement assigned to the user. The method proceeds to step 58.

In step 58, once the user has executed (run) the IAT 20, the IAT 20 may execute and/or generate output, including, but not limited to, one or more reports that are displayed (e.g., provided to).

Figure 4:
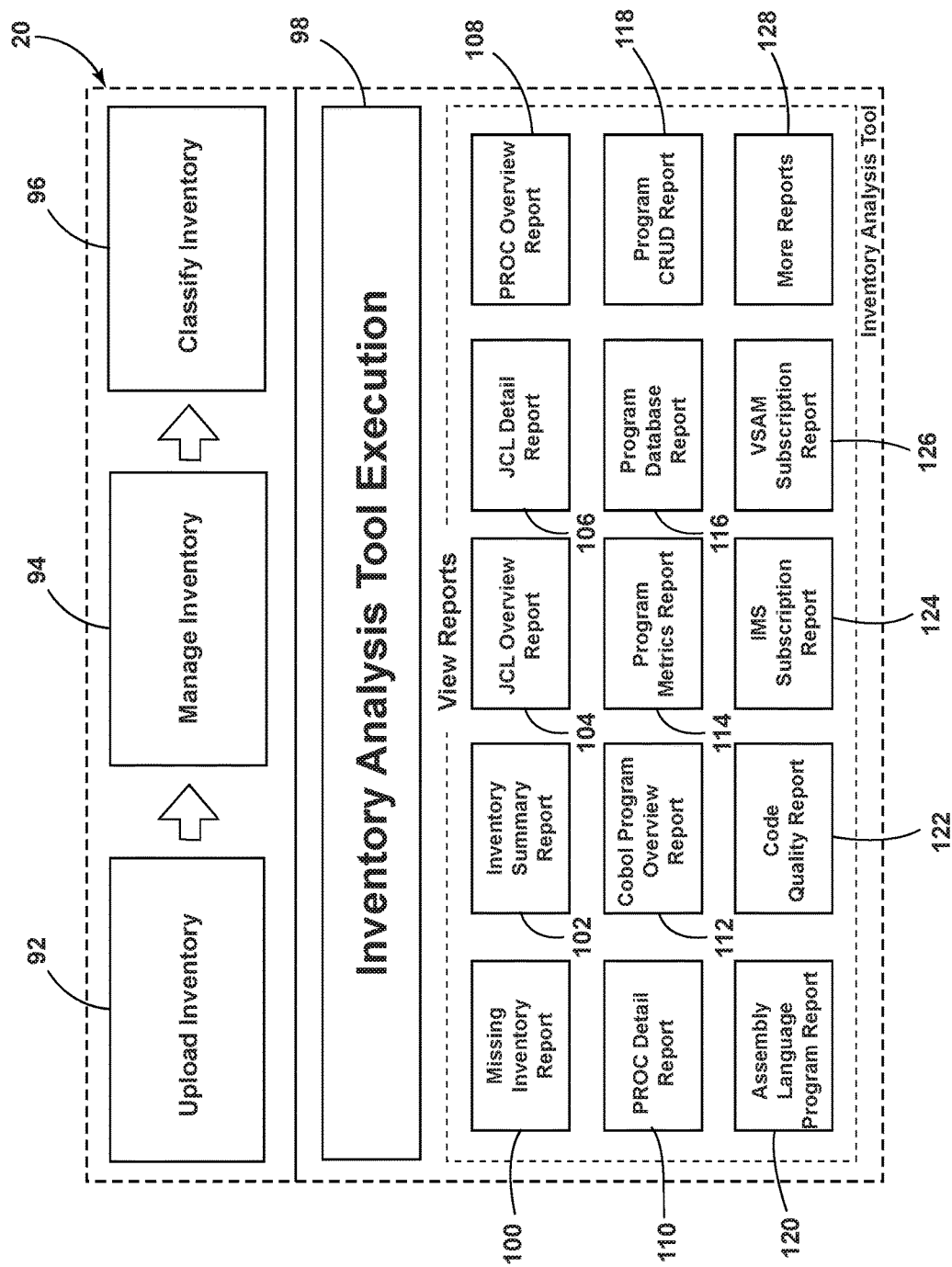
FIG. 4 is a block diagram generally illustrating in greater detail the method and apparatus for inventory analysis of FIG. 2.

FIG. 4 is a simplified block diagram showing, in greater detail, various functional blocks included in the IAT 20. As noted above, IAT 20 may be configured to provide an interactive analysis of the legacy application inventory (i.e., inventory of application source code). IAT 20 may be configured to provide application volumetric and/or complexity analysis and may be configured to provide job flow information and/or application source code quality reports. In embodiments, IAT 20 may be configured to classify application business modules to determine the complexity of the business modules. IAT 20 may be configured to inventory mainframes utilizing applications such as, but not limited to, COBOL, CICS, IMS, DB2, and/or VSAM. In embodiments, IAT 20 may be configured to analyze one or more inventory languages (e.g., COBOL, VSAM), simultaneously. In embodiments, IAT 20 may be configured to include NLP, that may permit a user to enter one or more queries via IAT 20 in human language (e.g., English).

IAT 20 includes, generally, an input facility, an execution facility, and an output facility. The input facility of IAT 20 comprises (i) a means or mechanism for allowing a user to upload an inventory of computer programming source code, which is designated by reference numeral 92; (ii) a means or mechanism for managing such inventory, designated by reference numeral 94; and (iii) a means or mechanism for classifying such inventory, designated by reference numeral 96. The execution facility of IAT 20 is designated by reference numeral 98. The output facility of IAT 20 comprises a plurality of different output report generators, respectively designated by reference numerals 100, 102, 104, 106, 108, 110, 112, 114, 116, 118, 120, 122, 124, 126, and 128 in FIG. 4.

Input Facility (FIGS. 5-8).

Figure 5:
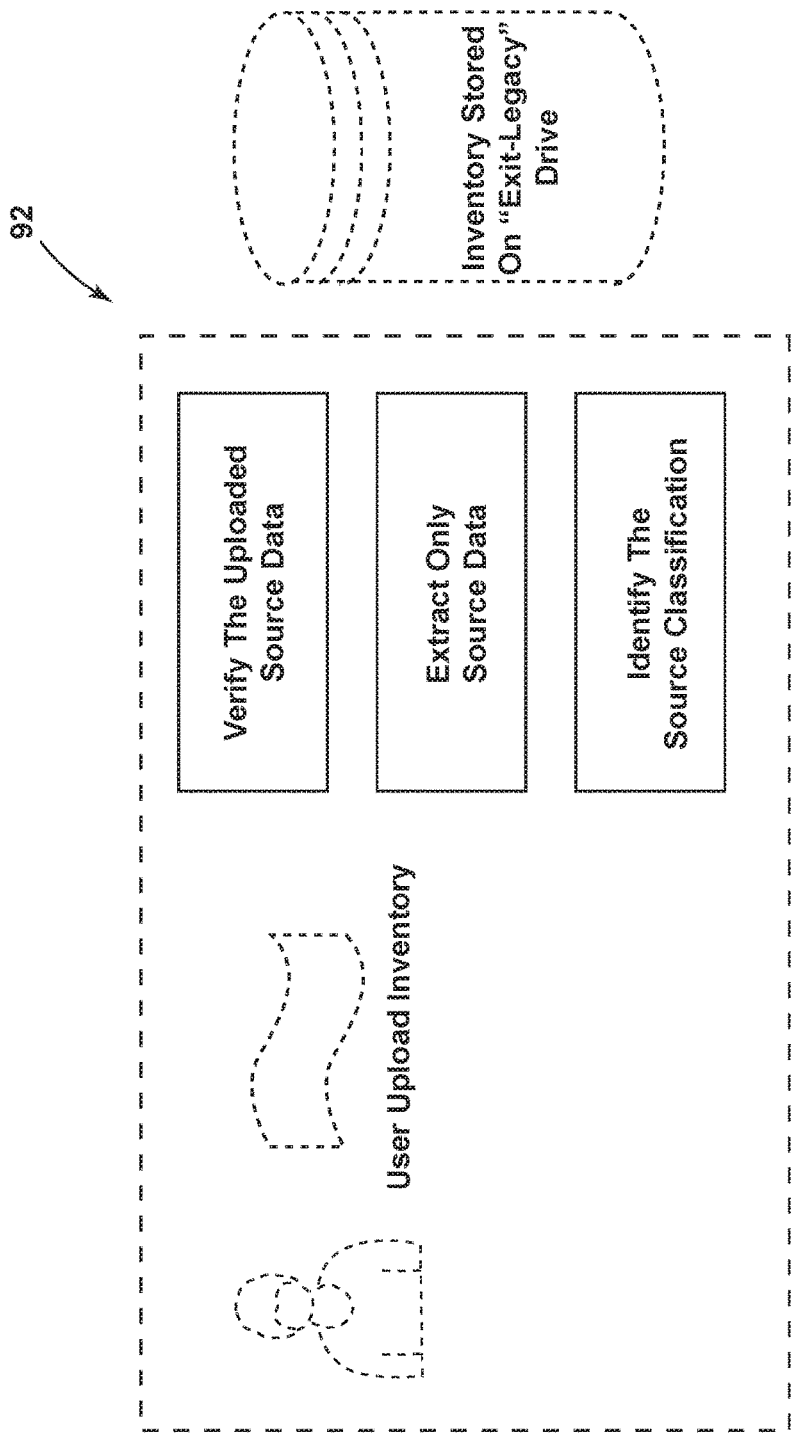
FIG. 5 is a block diagram generally illustrating an upload inventory feature of the method and apparatus for inventory analysis of FIG. 4.

FIG. 5 is a simplified diagrammatic and block diagram view of the upload inventory feature shown in FIG. 4. A user may start the IAT 20 process in module 92 by accessing IAT 20 via a GUI and/or selecting a customer application inventory to upload via the GUI (e.g., a drop-down list). A user may need to upload the entire application source code base (either in Exit Legacy or on web/on premises installation) to execute the IAT 20 for analysis. The application source code can be compressed and uploaded as a single zip file. The upload feature will copy the source code from the local system to the server where tool is deployed in a specific path. The path will be a combination of customer name, (\\Exitlegacy\Customername\projectname\input\cobol\).

The classification of the source code is done based on the language type/technology stack. Once the upload is complete, the inventory and inventory classification table is updated. The table will store all the information about the source code belongs to which project, type of source code (for e.g., COBOL program/COBOL copybook/JCL).

Figure 6:
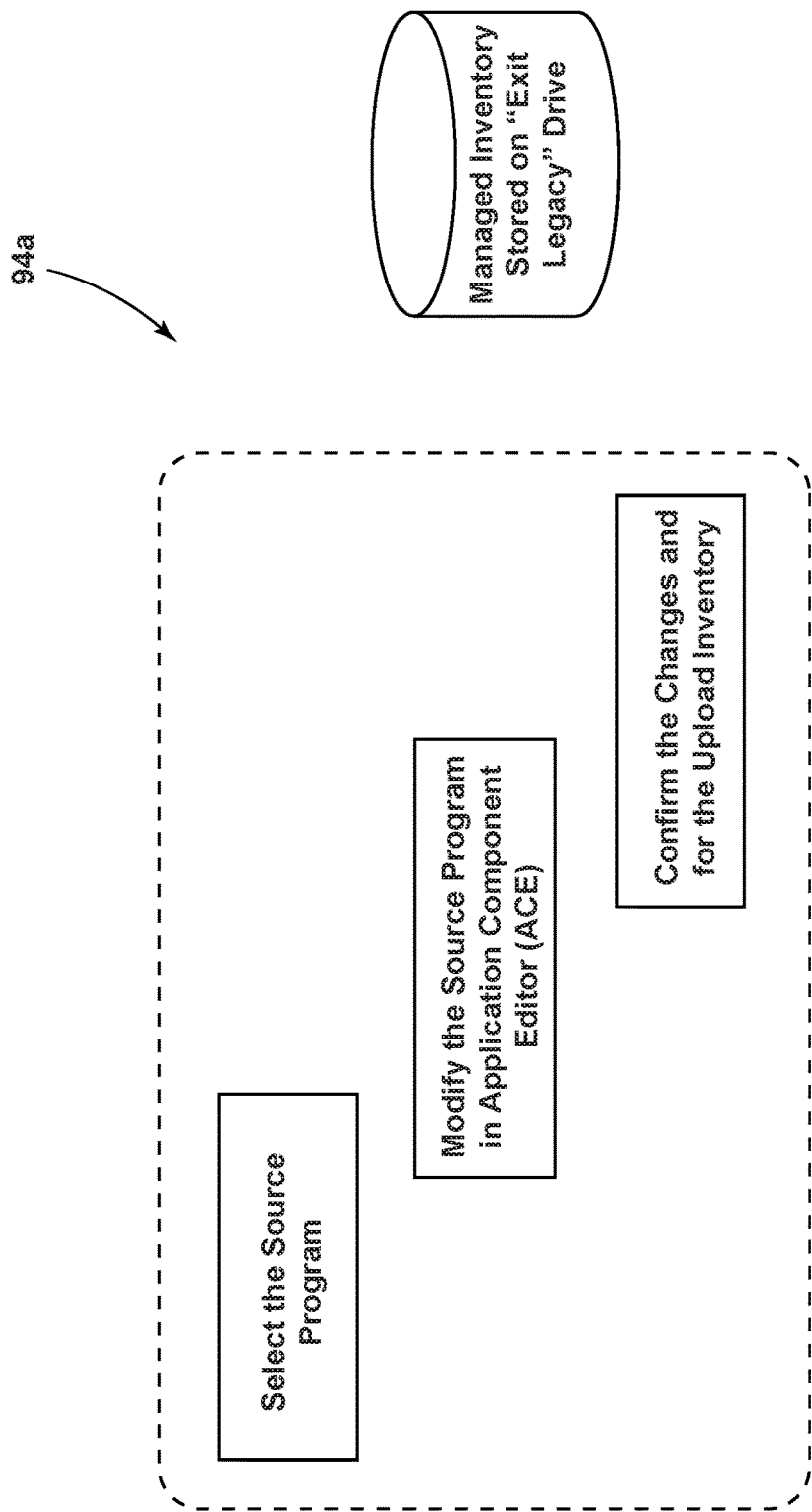
FIG. 6 is a block diagram generally illustrating a manage inventory feature of the method and apparatus for inventory analysis of FIG. 4.

FIG. 6 is a simplified diagrammatic and block diagram view of the manage inventory feature shown in FIG. 4. In module 94a, the user may manage the inventory of applications (e.g., via a drop down list), via the GUI. The view/edit component feature helps to edit the uploaded source by opening the selected component in the application component editor (ACE). After making the necessary changes the user can save/confirm the changes and the inventory/inventory classification table is updated accordingly. This option is mainly required for pre-processing the inventory for any unhandled syntaxes.

Figure 7:
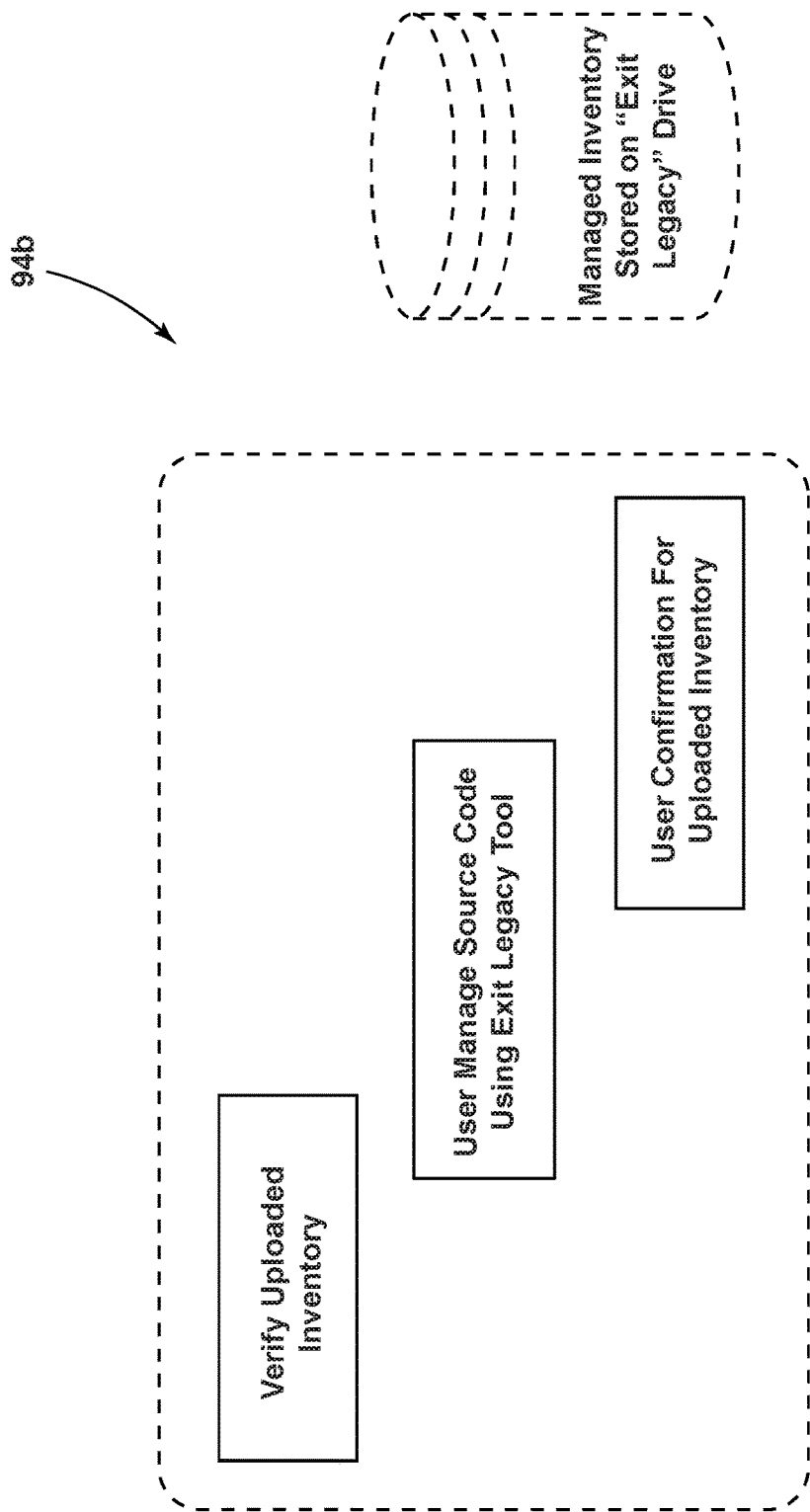
FIG. 7 is a block diagram generally illustrating a further manage inventory feature of the method and apparatus for inventory analysis of FIG. 4.

FIG. 7 is a simplified diagrammatic and block view diagram of the manage inventory feature shown in FIG. 4. In module 94b, the user may classify the inventory of applications via the GUI. Based on the delta upload, the inventory and the inventory classification will be updated. The manage inventory feature is not only limited to upload the deltas of the source code but also helps to manage the inventory by deleting the obsolete components or unwanted source code inventory for analysis.

Figure 8:
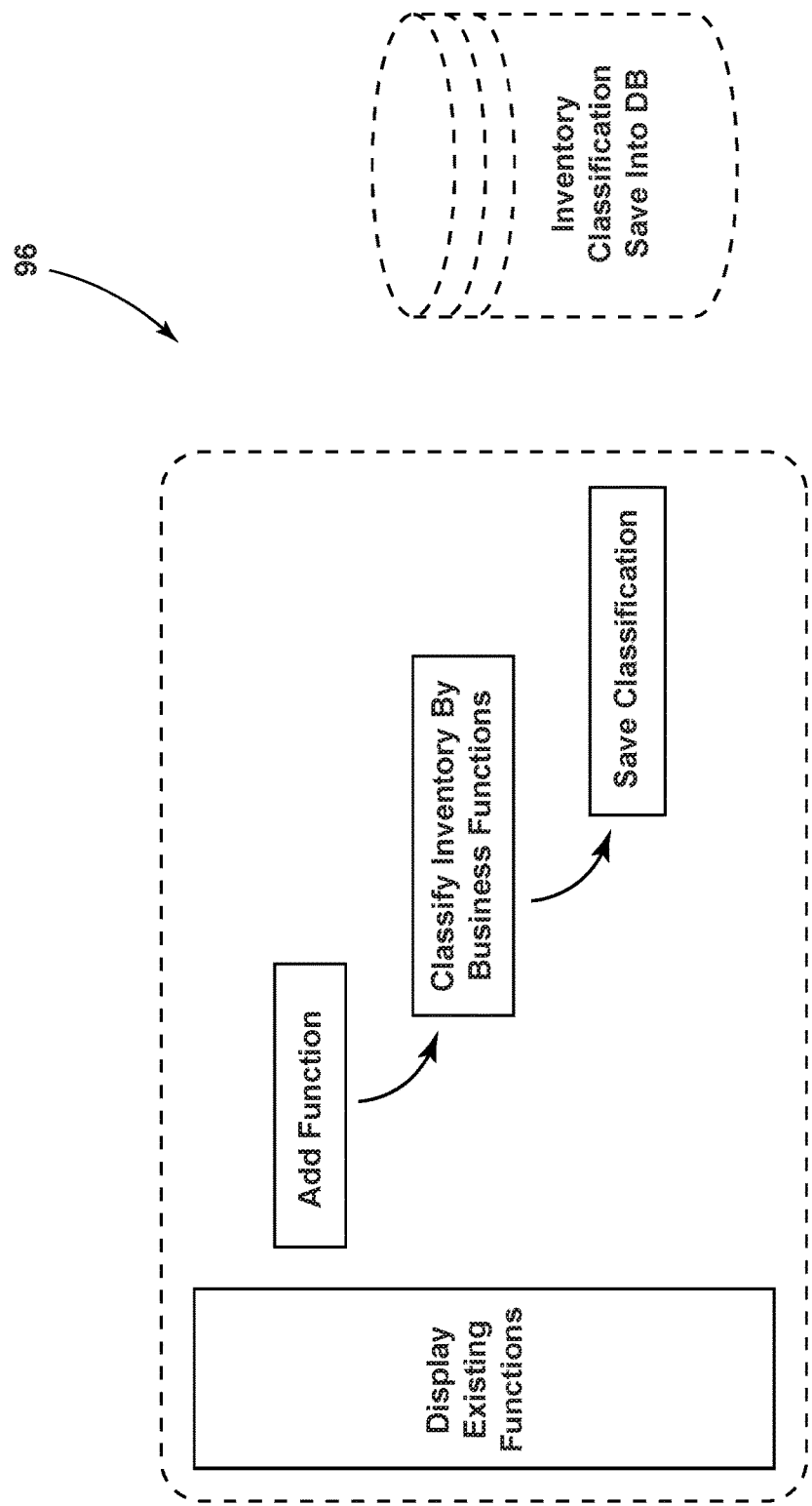
FIG. 8 is a block diagram generally illustrating a classify inventory feature of the method and apparatus for inventory analysis of FIG. 4.

FIG. 8 is a simplified diagrammatic and block view diagram of the manage inventory feature shown in FIG. 4. In module 96, the user may classify the source code based upon functionality. Once the business classification is complete, the inventory classification table will be updated accordingly. The business classification of the source will help the user derive the scope, if migration and/or modernization is intended for that particular portfolio. Once the business classification of the source code is complete, all the reports generated for the inventory will be specific for that business portfolio. Scoping can be completed very quickly.

Figure 9:
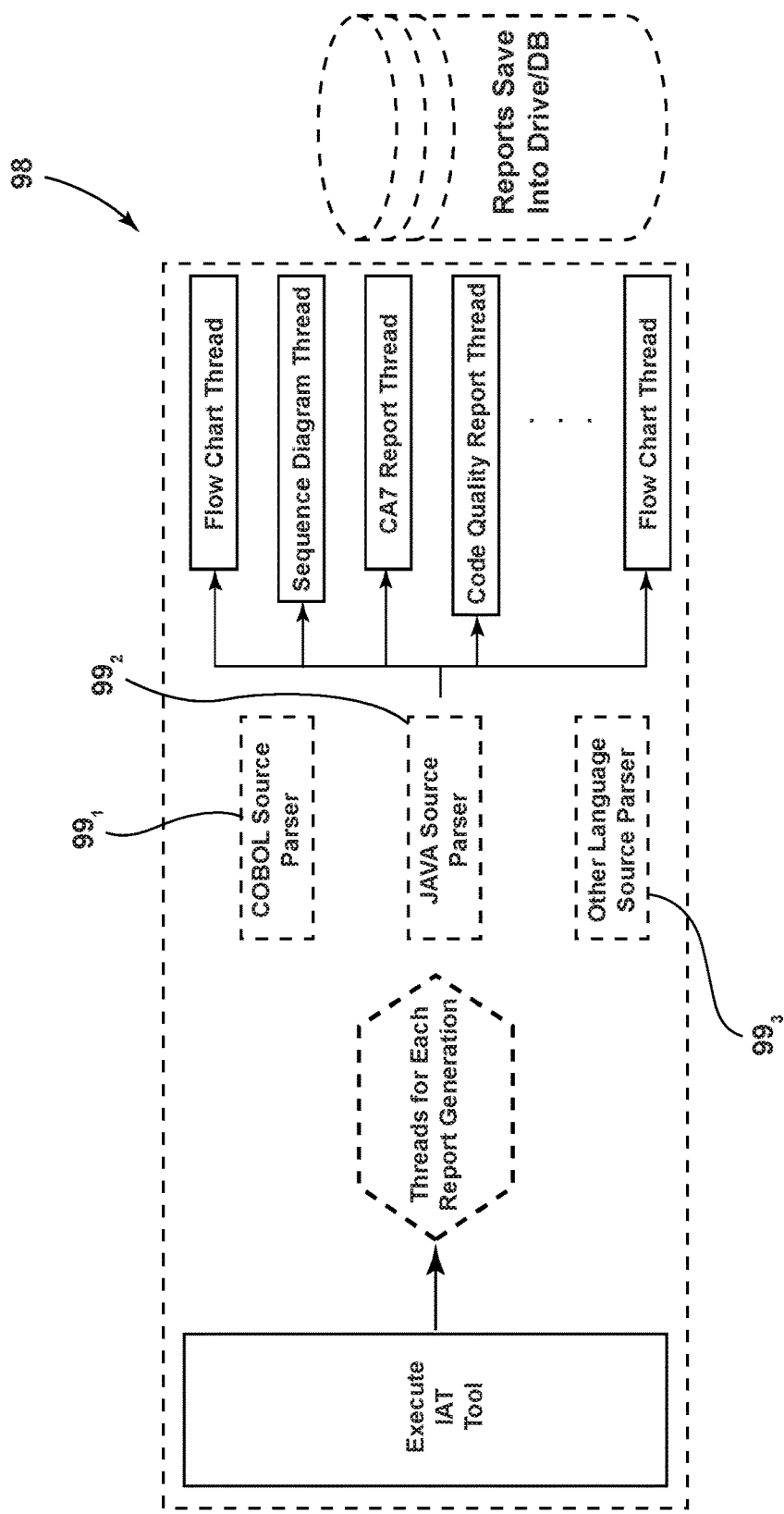
FIG. 9 is a block diagram generally illustrating an aspect of the execution of the method and apparatus for inventory analysis of FIG. 4.
Figure 10:
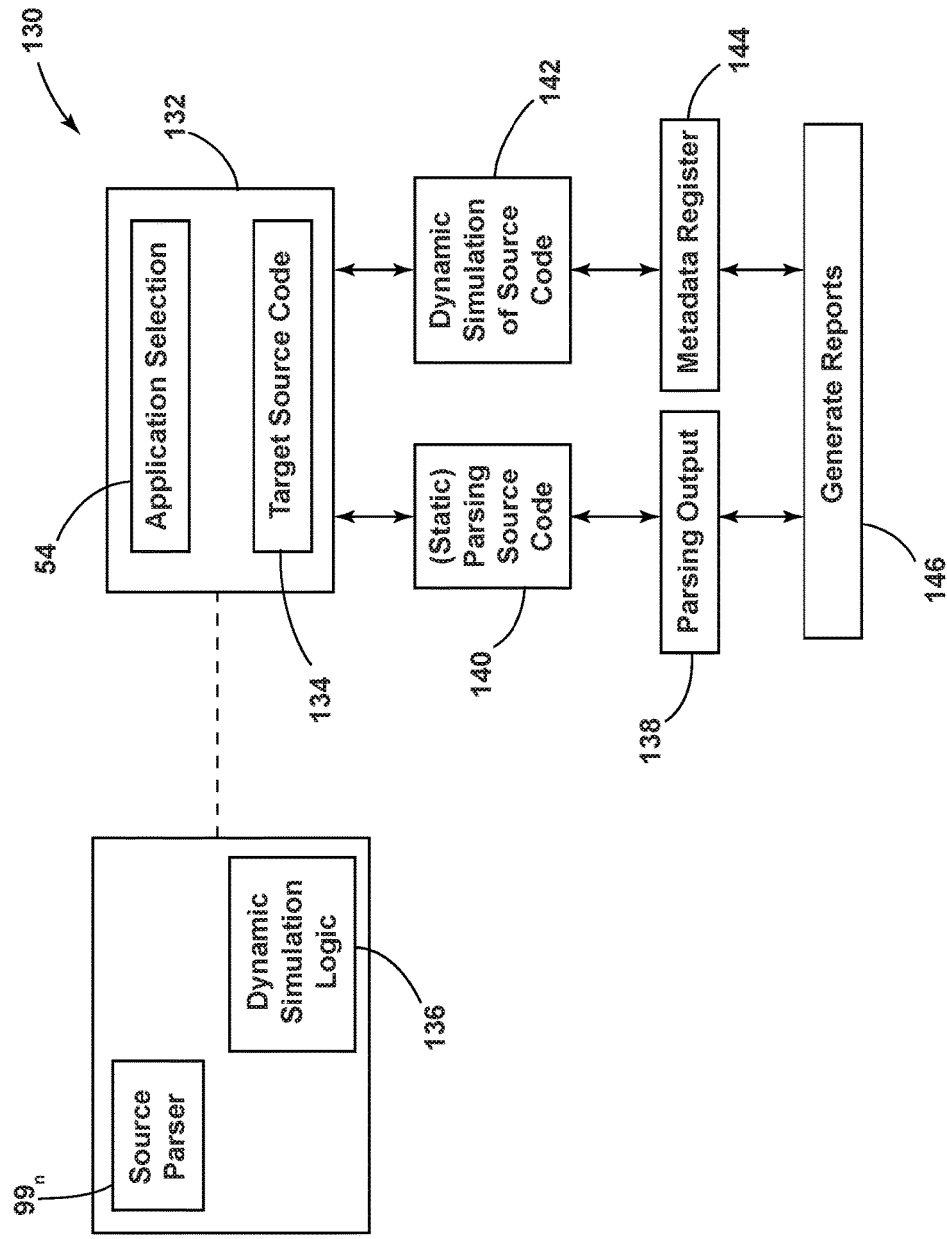
FIG. 10 is a block diagram generally illustrating a dynamic code simulation feature of the method and apparatus for inventory analysis of FIG. 4.
Figure 11:
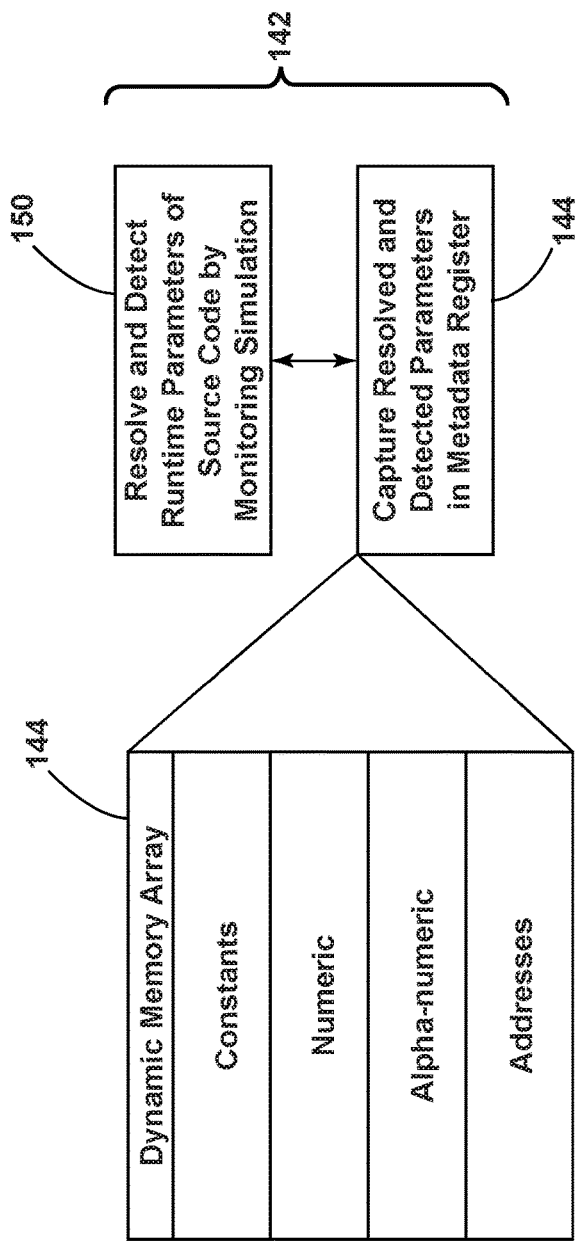
FIG. 11 is a block diagram generally illustrating in greater detail the dynamic code simulation feature of FIG. 10, in an embodiment.

Execution Facility (FIGS. 9-11).

FIG. 9 is a simplified diagrammatic and block view diagram of the manage inventory feature shown in FIG. 4. In module 98, IAT 20 may be configured to be executed (e.g., run), via a command supplied by the user via the GUI.

With continued reference to FIG. 9, first execution module 98 of IAT 20 may include one or more parser modules (e.g., shown as parser modules $99_1$, $99_2$, and $99_3$) configured to inventory one or more application source code languages simultaneously. For example, parser modules $99_1$, $99_2$, and $99_3$ may be configured for respectively parsing a COBOL, JAVA, and/or other language application. Since there are separate parser modules, one for each language, they can operate substantially simultaneously. Parser modules $99_1$, $99_2$, and $99_3$ may also measure (e.g., determine), the size of the application database and/or the size of the application file. Parser modules $99_1$, $99_2$, and $99_3$ may be configured to include a NLP based query facility that may permit a user to enter one or more queries via IAT 20 regarding the application source code. The outputs of the source code parser modules may include (i) volume and cyclomatic complexity (for effort estimation as well as scheduling); (ii) database statistics (for database migration); (iii) file and DB CRUD analysis (for database migration and micro services enablement); (iv) code quality report(s) (for code clean up before language conversion); (v) performance hotspot report (for performance tuning to achieve desired performance in target system); and (vi) dead code identification (to reduce technical debt of target system).

Parser modules $99_1$, $99_2$, and $99_3$ may also be configured to perform application source code inventory analysis via one or more heuristic algorithms. The heuristic algorithms may be configured to: (i) perform dynamic and/or static analysis via a simulation environment that may check (e.g., analyze) the application source code during execution; (ii) capture the application source code call chains; (iii) capture dynamic calls; and (iv) capture unused variables and/or obsolete programs (using memory forensic analysis to get the dynamically called program name). The heuristic algorithms may be configured to utilize memory forensic analysis to dynamically determine information pertaining to the application source code (e.g., program name). Simulation of the environment captures the dynamic values as well as the application file/database tables and/or related file/database operations. This process covers the complete application flow path to avoid omitting any portion during the inventory process. In embodiments, output from the parser modules $99_1$, $99_2$, and $99_3$ may include flowcharts that indicate all branch paths in the source code. The flowcharts are used to document (e.g., describe) a series of conditional execution for each decision path in the source code.

With continued reference to FIG. 9, a user may execute IAT 20 via the GUI and/or generate various reports. These reports may include: (i) a flow chart thread report; (ii) a sequence diagram thread report; (iii) a CA7 thread report; (iv) a code quality thread report; and/or (v) a language thread report.

IAT 20 may only execute upon a determination if the user (e.g., customer), has a subscription for the IAT 20. The portal authenticates user through unique id and password and when user executes the tool, the built in subscription mechanism continuously updates the usage and checks against the subscription limit. The tool execution stops as soon as usage exceeds the subscription limit. Once the user has executed IAT 20, IAT 20 first checks a table (e.g., "bought Capacity"—not shown), to determine if the user has subscribed to IAT 20 and if the user's utilization of IAT 20 has been reached. If the user has remaining utilization of IAT 20, IAT 20 will execute, continually updating the table as to the user's utilization of IAT 20 until a predetermined limit has been reached (e.g., exceeded), after which IAT 20 will terminate execution and display a message and/or status update that the utilization has been exhausted (e.g., "over limit").

IAT 20 may generate a workbench folder to handle (e.g., process) input files. IAT 20 may be configured to permit a user to perform an inventory analysis on selected files or on a complete inventory. The file selection helps the customer to perform the inventory on a specific domain functionality based on the functional classification. The following standard directory structure is created by Exit Legacy after selecting the files—(\\Exit-Legacy\<CUSTOMER-NAME>\<PROJECTNAME>\WORKBENCHNAME\ TOOL-NAME\EXECUTION\INPUT\FILE-TYPE). Based on the language type selected, different type of parser gets invoked to perform the inventory analysis. The parser helps create metadata from the source inventory and store the same in different database tables for further processing. After processing all the information will be stored in "OBJECT MASTER" table and "PROG MASTER" table. All the component level information is stored in the "PROG-COMPONENT" table. Information about the database calls in the source inventory is stored in a program input/output "PROG-IO" table. Standard sets of reports will be generated for all the languages and specific reports for special languages. Standard directory structure will be created by Exit Legacy and the generated reports are stored under the same.

Parser modules $99_1$, $99_2$, and $99_3$ of IAT 20 may be configured to parse the application source code for inventory analysis according to the type of language selected. Parser modules $99_1$, $99_2$, and $99_3$ may be configured to generate metadata from the application source code inventory and/or store the metadata in one or more database tables for additional processing and/or analysis. After processing and/or analyzing the metadata, IAT 20 may be configured to store the metadata in a table (e.g., "OBJECT MASTER" table and a "PROGRAM MASTER" table—not shown). Some or all of the component level metadata may be stored in "PROG-COMPONENT" table. Metadata pertaining to database calls may be stored in the application source code inventory in "PROG-IO" table. IAT 20 and/or parser modules $99_1$, $99_2$, and $99_3$ may be configured to generate one or more reports for the one or more languages of the application source code and/or separate reports for each language of the application source code (e.g., COBOL). IAT 20 may generate a directory structure to store the one or more generated reports.

FIG. 10 is a simplified block diagram showing, in greater detail, the execution of the IAT 20, designated broadly as source code processing 130. Source code processing 130 includes defining target source code 132. As described above in connection with FIG. 3, a user can first select an application (see step 54 in FIG. 3). By virtue of this selection, a target source code is defined, represented as block 134. It should be understood that this may be performed by identifying the source code file(s) in inventory as a result of the user selection of the application. Furthermore, recall that IAT 20 includes one or more parser modules $99_1$, $99_2$, and $99_3$ one of which is shown in FIG. 10 as a parser module $99_n$. (which is stored in memory 504 and configured to be executed by one or more of the processor(s) 502). Additionally, IAT 20 also includes a dynamic code simulation module 136, stored in memory 504, and configured to be executed by one or more processor(s) 502. While the parser module 99$_n$ is configured to parse the target source code in a conventional sense of the term parsing, the dynamic code simulation module 136 is configured to dynamically simulate execution of the code for purposes to be described below. Thus, as shown in FIG. 10, once the target source code 134 has been selected/identified, it is acted upon by parser module 99$_n$ suited to the specific programming language (e.g., COBOL, etc.), whose parser outputs are designated by block 138, as well as being acted upon by the dynamic simulation module 136. This is represented by the parallel paths shown in FIG. 10.

With continuing reference to FIG. 10, the parser outputs are acted upon by the dynamic simulation module 142. In dynamic simulation module 142, IAT 20 simulates the memory of each application component without actually running the component on a given platform (e.g., COBOL). IAT 20 creates (e.g., simulates), multiple memory arrays (dynamic memory array 144, shown in detail in FIG. 11), that are dynamic and may hold different types of data (e.g., constants, numeric, alphanumeric, and/or addresses). Dynamic simulation module 142 resolves and detects runtime parameters of the source code by monitoring the progress of the simulation. Dynamic simulation module 142 captures resolved and detected parameters which are stored in metadata register 144. Parsing output 138 and metadata register 144 are used by IAT 20 for analysis and generation of reports as well as conversion to a different language and/or database. In embodiments, dynamic simulation module 142 uses dynamic code analysis to extract all the branch paths of the source code based on the metadata (e.g., test data) generated to simulate execution of the source code. By dynamically analyzing the source code, all parameters (e.g., inventory, language, business rules) may be extracted from the source code. In embodiments, output of the dynamic simulation module 142 is used to test the newly created code. Dynamic simulation module 142 generates data sets that interact with the newly created code (e.g., inventory, business rules, language) together with the expected results from executing the newly created code. The data sets are used to test (e.g., verify) the accuracy of the migration of the source code.

Dynamic code analysis was developed specifically for dynamic business rule extraction and multi flowchart generation. Dynamic code analysis extracts all the branch path of the programs based on the test data provided to the simulated program execution. The objective is to make sure all the business rules are extracted and 100% code coverage is achieved. Static and dynamic outputs are used in different contexts. Static output such as flowcharts are used to make sure that all possible branch paths are covered. The flowcharts help to document a series of conditional execution for each decision path. Dynamic output is used in a later stage to test the newly created code. Various data sets are prepared which will trigger the business rules that have been identified along with the expected results. The test cases are executed for the new application to determine the sanctity of migration.

FIG. 11 is a simplified block diagram showing, in greater detail, the execution of IAT 20, designated broadly as dynamic memory array 144 and dynamic simulation of source code module 142, including resolve and detect runtime parameters of source code by simulation module 150 and capture resolved and detected parameters in metadata register 144. The simulation (e.g., execution) of the source code generates dynamic data, stored in dynamic memory array 144. IAT 20 is configured to analyze the inventory of the program statically via parsing of the source code and dynamically via simulating the source code. Static parsing of the source code is limited to the source code prior to execution. In dynamic simulation of the source code, the source code is expanded and converted into formats that virtual machines in the dynamic simulation module 142 can execute (e.g., run) the source code. In embodiments, data samples based on data types parsed from the source code are inserted into the dynamic simulation to identify different execution branch paths (e.g., amounts greater than a predetermined amount, employee age over 65). The parsing output 138 and the metadata register 144 are used by IAT to generate reports pertaining to the source code that include all components of the source code are inventoried and classified by IAT 20.

Static Parsing does not reflect the runtime execution of the actual code. So, via simulation, the actual code is expanded and converted into the form where the virtual machines would be run the code in itself. This dynamic parsing is only available via simulation of the virtual machine. Sample data based on the data types is also passed into it to identify the different execution branch paths.

Figure 12:
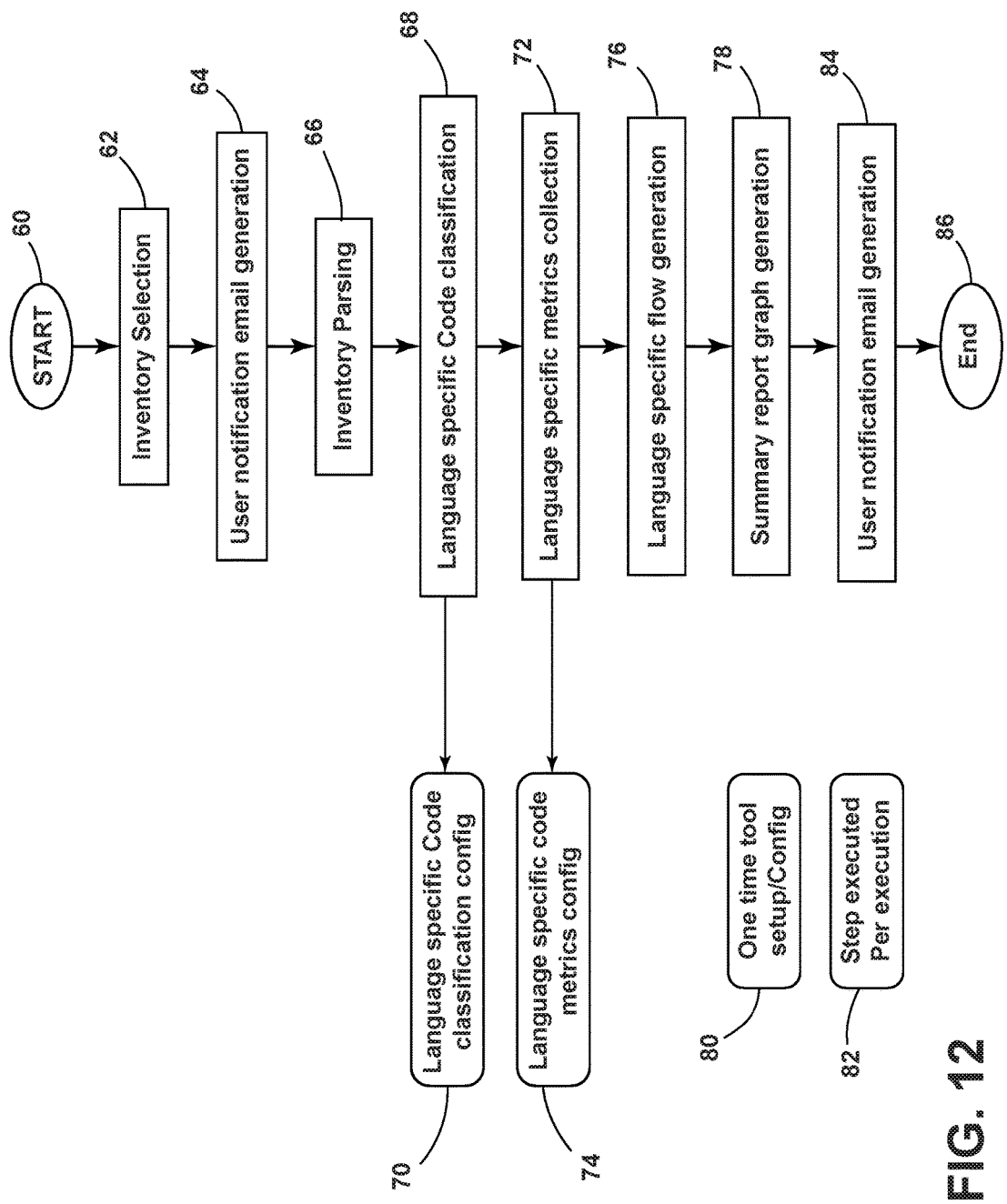
FIG. 12 is a flowchart generally illustrating a further aspect of the execution of the method and apparatus for inventory analysis of FIG. 4.

FIG. 12 is a high-level flow chart diagram illustrating, in an embodiment, the operation of a method of operation of the IAT 20 included in the larger legacy migration tool 506. The method begins in step 60.

In step 62, the user may select an application from an inventory list via the GUI (e.g., a drop-down list).

In step 64, the user may receive one or more email notifications from IAT 20. The email notifications may include information such as, but not limited to, subscription information, login information, and/or usage information. The email notifications may also include a usage table, such as "Bought capacity" to determine if the user has a subscription that includes IAT 20 and if the user has any capacity remaining to utilize IAT 20. The method then proceeds to step 66.

In step 66, IAT 20 parses the inventory of application(s) selected by the user via the GUI. The method then proceeds to steps 68 and 70.

In steps 68 and 70, IAT 20 classifies the application(s) according to language(s) (e.g., COBOL, JAVA), parsed and executes any language-specific classification configuration utilities. The method then proceeds to steps 72 and 74.

In steps 72 and 74, IAT 20 collects language-specific metrics (e.g., attributes) according to the language(s) parsed and executes any language-specific metrics configuration utilities. The method then proceeds to step 76.

In step 76, IAT 20 generates language specific flow charts that may be displayed to the user via the GUI. The method then proceeds to step 78.

In step 78, IAT 20 generates a summary report to the user pertaining to the parsed inventory of the application source code. IAT 20 may generate a summary report that may include multiple reports for the inventory uploaded to assess the migration of the application. For example, IAT 20 may process applications in languages such as COBOL, Assembler, JAVA, VB, AB-INITIO, Coolgen, PL/I, and/or Natural and databases in formats such as ADABAS, DB2, VSAM, and/or IMS. The method then proceeds to optional step 80.

In step 80, an optional step, IAT 20 executes a one-time tool setup and/or configuration utility. This utility may be executed for a first-time application analysis using IAT 20. The method then proceeds to step 82.

In step 82, IAT 20 determines if step 80 is necessary each time IAT 20 is executed. The method then proceeds to step 84.

In step 84, IAT 20 generates a user notification email. The email may include information pertaining to the inventory analysis performed by IAT 20, as well as subscription information, updated after the execution of IAT 20.

Output Facility (FIG. 4).

FIG. 4 is a simplified block diagram showing, in greater detail, various functional blocks included in the IAT 20. A user may select, via the GUI, that IAT 20 generate reports after execution of the source code inventory analysis. Missing inventory report module 100 details results of parsing of the source code. For example, "PROG-COMPONENT" table is checked to determine if an invoked component is present in the parsed source code. If the component is not located by IAT 20, the status of the invoked component is set to a predetermined status (e.g., "N"). Missing inventory report module 100 lists all components with a status of "N" as missing components of the inventory. A call tree report simulates the execution of the program to capture the flow path (to the nth level) of the program and to create the metadata. Recursive program calls are handled by setting a flag so that the call chain does not loop indefinitely. Intractable dynamic program calls are analyzed in the simulated environment to get the list of programs that are executed and not executed by using memory forensic analysis.

Inventory summary report module 102 generates multiple reports for the source code inventory uploaded to assess the application from a migration and/or modernization perspective. Inventory summary report 102 can include languages such as COBOL, Assembler, JAVA, VB, AB-INITIO, Coolgen, PL/1, and/or Natural as well as database formats such as ADABAS, DB2, VSAM, and/or IMS. Open source libraries may be inserted into IAT 20 to generate intuitive output reports and/or dashboards. Open source libraries include Graphviz for flowcharts, Plant UML for sequence diagrams, Sonar for dead and duplicate code, Google chart for chart generation and/or PhantomJS for CA7 flowchart reports.

JCL overview report module 104 generates a flow diagram that is based on the batch scheduler dump, the flow diagram includes all the predecessor and successors of the job. This flow diagram gives the user end to end flow of the batch job. This execution uses the PhantomJS library to generate the control of the M & CA7 flow chart.

JCL detail report module 106 generates a report that gives the user detailed information about the uploaded JCLs. It also gives step level details including PROCs, control cards, utilities, database, files and Generation Data Groups (GDGs).

PROC overview report module 108 and PROC detail report module 110 generates flow diagrams that provide high-level and detailed JCL procedures of the application source code.

COBOL program overview report module 112 includes a performance hot spot that helps the user to optimize the performance of the COBOL programs. It identifies the number of impacted programs, missing commit statements for the insert, update, scalar function queries, and unused variables in SQL queries as well as indexed and non-indexed predicates, cursor with updates/without updates that help the user to understand application performance boundary lines.

Program metrics report module 114 generates a report that details the complexity, lines of code, executable lines of code, and/or commented lines of code. A program dashboard report may include high level information of all uploaded files, number of programs, copybooks used, number of batch programs, online programs, and CICS programs.

Program database report module 116 generates a report that helps the user understand the different databases and/or files used by the source code and also details pertaining to the operation of the databases and/or files of the source code.

Program CRUD report module 118 generates a report that helps the user understand the CRUD database/file operations defined in the application source code.

Assembly language program report module 120 generates a report that includes macros of the source code and the corresponding number of calls at the inventory level. The report may also provide detailed information on the assembly program of the source code and any macros the source code contains, the number of macros, lines of code, commented lines of code of the copybook, and macro and assembly programs.

Code quality report module 122 generates a report that includes high level information about the percentage of dead code in the source code, number of stop-run statements, go-to statements, and/or alter statements, as well as nested if's, if nested more than a predetermined number (e.g., 7), location in the source code and name of the application. The report may include intuitive graphical representations of code quality (e.g., charts). A code quality detail report may include component level details about dead code, stop-run statements, go-to statements, alter statements, nested if's if more than 7, with line number, and program name.

IAT 20 may also generate reports relating to an IMS subscription 124 and a VSAM subscription 126.

IAT 20 may also generate additional reports 128. These reports include an auto documentation report that generates the pseudo level English translation of the uploaded source code. This helps the user to understand the business logic and technical flow of the program.

A complexity report is generated by using a Halstead algorithm to derive the cyclomatic complexity and current maintainability index of the programs, thus helping to efficiently discover the current technical debts and to generate an action plan.

A non-compliance analysis report uses a configurable rule engine to generate the non-compliance analysis report for the components that are not meeting the enterprise architecture standards.

A JAVA report generates a class diagram of the JAVA class structure and its hierarchy diagram. Open source SONAR library may be used to analyze the program and create metadata for class diagrams. A JAVA sequence diagram report is similar to the JAVA class diagram, and is generated using the open source SONAR library. This report helps the user to understand the sequential execution flow of the program and its operations.

A VB report includes a matrix report that gives the user a high level glimpse on class name, module name, line of code, and forms. The VB report also includes a dashboard report that gives the user an overview of the uploaded inventory, a detailed report that gives the details of all of the methods in the VB source code, generates English language documents for the VB source code, and generates a sequence diagram for the VB source code.

A Natural report includes call tree reports that help the user understand the program calls, sequence of the calls, and what are all the various operations performed in the entire call chain. The report is not limited to the above, but also includes providing information about the total number of lines of code for the entire call chain, what are the different DB calls, types of components used/called and its line of code. If an online program, it also reports the natural maps called and gives the total number of missing components in the entire program call chain. The Natural report also generates a list of unused/unwanted components by scanning through the component mapping table and if the program/subprogram components are not referenced by any of the components, then those components are declared as unused/independent components. The Natural report also generates a list of unused variables that is program specific and reports all the variables/DB fields that are declared in the program but are never used in the program.

It should be understood that a processor (e.g., processor 502), as described herein may include a conventional processing apparatus known in the art, capable of executing preprogrammed instructions stored in an associated memory, all performing in accordance with the functionality described herein. To the extent that the methods described herein are embodied in application source code, the resulting application source code can be stored in an associated memory, such as memory 504, and can also constitute the means for performing such methods. Such a system or processor may further be of the type having both ROM, RAM, a combination of non-volatile and volatile (modifiable), memory so that any application source code may be stored and yet allow storage and processing of dynamically produced data and/or signals.

In embodiments, a memory (e.g., memory 504), may be configured for storage of data, instructions, and/or code (e.g., dynamic simulation logic 136), and is coupled to at least a corresponding processor. Memory may include various forms of non-volatile (e.g., non-transitory), memory including flash memory, read only memory (ROM), including various forms of programmable read only memory (e.g., PROM, EPROM, EEPROM), and/or volatile memory such as random access memory (RAM), including static random access memory (SRAM), dynamic random access memory (DRAM), and/or synchronous dynamic random access memory (SDRAM). Although memories and processors may be illustrated as separate components, it should be understood that, in embodiments, a memory may be internal to a processor.

Display devices may be configured to display aspects of GUIs, which may be generated by the operation of logic (e.g., dynamic simulation logic 136). Display devices may be, for example only, a liquid crystal display or light emitting diode display or other technologies known in the art. Display devices may function as only an output device with input received through other I/O devices (e.g., I/O devices), such as a keyboard or mouse (not shown). Alternatively, display devices may also function as an input device and may include a touch screen display including, for example, capacitive and/or resistive touch screen displays, and/or other technologies known in the art.

It should be further understood that an article of manufacture in accordance with this disclosure includes a non-transitory computer-readable storage medium (e.g., memory 134), having a computer program encoded thereon for implementing logic and other functionality described herein. The computer program may include code to perform one or more of the methods disclosed herein. Such embodiments may be configured to execute on one or more processors, multiple processors that are integrated into a single system or are distributed over and connected together through a communications network, and/or where the network may be wired or wireless. Code for implementing logic may, when executed by a processor, cause a plurality of transistors to change from a first state to a second state. A specific pattern of change (e.g., which transistors change state and which transistors do not), may be dictated, at least partially, by the logic and/or code. For example, and without limitation, in embodiments, processor of system may include a plurality of transistors that change state according to logic and/or code that implements logic.

In embodiments, the term "module" includes an identifiable portion of computer code, computational instructions, executable instructions, data, and/or a computational object to achieve a particular function, operation, processing, and/or procedure. A module may be implemented via software, hardware/circuitry, or a combination of software and hardware. A module, for example, may comprise one or more physical or logical blocks of computer instructions that may, for instance, be organized as an object, procedure, or function. In embodiments, executables of a module may not be physically located together and/or may include disparate instructions stored in different locations which, when joined logically together, may comprise the module and/or achieve the stated purpose for the module. In embodiments, a module may include a single instruction, many instructions, and/or may be distributed over several different code segments, among different programs, and/or across several memory devices. In embodiments, modules may represent data and may be embodied in any suitable form and/or may be organized within any suitable type of data structure. The represented data may be collected as a single data set and/or may be distributed over different locations, such as different storage/memory devices.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like), are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure as defined in the appended claims.

Any element in a claim that does not explicitly state "means for" performing a specified function, or "step for" performing a specific function, is not to be interpreted as a "means" or "step" clause as specified in 35 U.S.C. § 112, paragraph 6 (pre-AIA), or 35 U.S.C. § 112(f) (AIA). In particular, the use of "step of" in the claims is not intended to invoke the provisions of 35 U.S.C. § 112, paragraph 6 (pre-AIA) or 35 U.S.C. § 112(f) (AIA).

What is claimed is:

1. A computerized method comprising the steps of:
    selecting at least one application having a source code;
    parsing the source code and generating a first output;
    dynamically analyzing the source code by simulating the memory of the at least one application having the source code and simulating execution of the source code within the simulated memory to produce a second output wherein the second output comprises runtime metadata associated with the selected at least one application, wherein the dynamically analyzing the source code further comprises:
        simulating memory to simulate execution of the source code by creating at least one dynamic memory array;
        simulating the execution of the source code within the dynamic memory array;
        detecting and resolving parameters of the source code by monitoring the simulated execution of the source code;
        storing the detected and resolved parameters of the source code in a metadata register; and
        generating at least one report of the source code based upon the detected and resolved parameters stored in the metadata register;
    converting, using said first output and said second output comprising runtime metadata, at least one of:
        (i) the source code of the selected application in an original language to a destination language; and
        (ii) a data source associated with the selected application in an assigned format to a destination format;
    generating a test case from the second output; and
    executing the test case to verify one of the (i) destination language and (ii) destination format.

2. The method of claim 1, further comprising classifying the source code according to functionality and updating an inventory classification table and summarizing an inventory of the source code.

3. The method of claim 1, further comprising parsing the source code to determine non-functional and duplicate source code, generating a natural language based query for searching the source code, and classifying business rules of the source code and identifying logical conditions of the business rules.

4. The method of claim 3, wherein identifying logical conditions of the business rules further comprises identifying child statements of the business rules and generating a report of the business rules and child statements of the business rules.

5. The method of claim 1, further comprising extracting and parsing business rules, comparing the business rules for similarity and duplication, and generating a flowchart of the business rules.

6. The method of claim 1, wherein detecting and resolving parameters of the source code by monitoring the simulated execution of the source code includes detecting and resolving registers and operands of the source code.

7. An article of manufacture, comprising:
    a non-transitory computer storage medium having a computer program encoded thereon for inventory analysis, said computer program including code for:
        selecting at least one application having a source code;
        parsing the source code and generating a first output;
        dynamically analyzing the source code by simulating the memory of the at least one application having the source code and simulating execution of the source code within the simulated memory to produce a second output wherein the second output comprises runtime metadata associated with the selected at least one application, wherein the dynamically analyzing the source code further comprises:
            simulating memory to simulate execution of the source code by creating at least one dynamic memory array;
            simulating the execution of the source code within the dynamic memory array;
            detecting and resolving parameters of the source code by monitoring the simulated execution of the source code;
            storing the detected and resolved parameters of the source code in the metadata register; and
            generating at least one report of the source code based upon the detected and resolved parameters stored in the metadata register;
        converting, using said first output and said second output comprising runtime metadata, at least one of:
            (i) the source code of the selected application in an original language to a destination language; and
            (ii) a data source associated with the selected application in an assigned format to a destination format;
        generating a test case from the second output; and
        executing the test case to verify one of the (i) destination language and (ii) destination format.

8. The article of manufacture of claim 7 wherein said computer program includes code for:
    (i) analyzing the source code for obsolete and unwanted components;
    (ii) deleting obsolete source code; and
    (iii) verifying, extracting, and identifying the source code prior to simulated execution.

9. The article of manufacture of claim 7 wherein said computer program includes code for:
    (i) classifying the source code according to functionality;
    (ii) updating an inventory classification table; and
    (iii) summarizing an inventory of the source code.

10. The article of manufacture of claim 7 wherein said computer program includes code for:
    (i) parsing the source code to determine non-functional and duplicate source code;
    (ii) generating a natural language based query for searching the source code; and (iii) classifying business rules of the source code and identifying logical conditions of the business rules.

11. The article of manufacture of claim 7 wherein said computer program includes code for:
(i) identifying child statements of business rules; and
(ii) generating a report of the business rules and child statements of the business rules.

12. The article of manufacture of claim 7 wherein said computer program includes code for:
(i) extracting and parsing business rules;
(ii) comparing the business rules for similarity and duplication; and
(iii) generating a flowchart of the business rules.

13. The article of manufacture of claim 7 wherein said computer program includes code for detecting and resolving registers and operands of the source code.

14. A system comprising:
one or more computing devices including a memory having program code stored therein and a processor in communication with the memory for carrying out instructions in accordance with the stored program code, wherein the program code, when executed by the processor, causes the processor to:
select at least one application having a source code;
parse the source code and generating a first output;
dynamically analyze the source code by simulating the memory of the at least one application having the source code and simulating execution of the source code within the simulated memory to produce a second output wherein the second output comprises runtime metadata associated with the selected at least one application, wherein the dynamically analyzing the source code further comprises:
simulating memory to simulate execution of the source code by creating at least one dynamic memory array;
simulating the execution of the source code within the dynamic memory array;
detecting and resolving parameters of the source code by monitoring the simulated execution of the source code;
storing the detected and resolved parameters of the source code in a metadata register; and
generating at least one report of the source code based upon the detected and resolved parameters stored in the metadata register;
convert, using said first output and said second output comprising runtime metadata, at least one of:
(i) the source code of the selected application in an original language to a destination language; and
(ii) a data source associated with the selected application in an assigned format to a destination format;
generate a test case from the second output; and
execute the test case to verify one of the (i) destination language and (ii) destination format.

15. The system of claim 14, wherein classifying the source code according to functionality and updating an inventory classification table and summarizing an inventory of the source code.

16. The system of claim 14, wherein dynamic analyzing the source code further comprises parsing the source code to determine non-functional and duplicate source code, generating a natural language based query for searching the source code, and classifying business rules of the source code and identifying logical conditions of the business rules.

17. The system of claim 14, wherein detecting and resolving parameters of the source code by monitoring the simulated execution of the source code includes detecting and resolving registers and operands of the source code.

* * * * *